(12) United States Patent
Ralfs et al.

(10) Patent No.: US 9,296,189 B2
(45) Date of Patent: Mar. 29, 2016

(54) METHOD OF MANUFACTURING A COMPOSITE STRUCTURE AND COMPOSITE STRUCTURE OBTAINED THEREBY

(75) Inventors: Benjamin Ralfs, East Cowes (GB); John Moram, East Cowes (GB)

(73) Assignee: GKN Aerospace Services Limited, Hampshire (GB)

( * ) Notice: Subject to any disclaimer, the term of this patent is extended or adjusted under 35 U.S.C. 154(b) by 261 days.

(21) Appl. No.: 13/878,492

(22) PCT Filed: Oct. 11, 2011

(86) PCT No.: PCT/GB2011/051954
§ 371 (c)(1),
(2), (4) Date: Apr. 9, 2013

(87) PCT Pub. No.: WO2012/049487
PCT Pub. Date: Apr. 19, 2012

(65) Prior Publication Data
US 2013/0199718 A1    Aug. 8, 2013

(30) Foreign Application Priority Data
Oct. 11, 2010    (GB) .................................. 1017121.3

(51) Int. Cl.
*B32B 37/18*    (2006.01)
*B32B 38/00*    (2006.01)
(Continued)

(52) U.S. Cl.
CPC ............. *B32B 37/18* (2013.01); *B29C 33/0011* (2013.01); *B29C 33/20* (2013.01);
(Continued)

(58) Field of Classification Search
CPC .. B29C 33/0011; B29C 33/20; B29C 33/485; B29C 70/386; B29C 70/54; B29C 70/382; B29L 2031/7504; B32B 37/18; B32B 38/0004; Y10T 156/108
USPC .......................................... 156/242; 267/242
See application file for complete search history.

(56) References Cited

U.S. PATENT DOCUMENTS 4,980,006 A    12/1990    Bordner
5,685,933 A    11/1997    Ohta et al.
(Continued)

FOREIGN PATENT DOCUMENTS

GB    2452298 A    3/2009
GB    2453833 A    4/2009
GB    2467417 A    8/2010

OTHER PUBLICATIONS

The International Search Report and Written Opinion dated Mar. 14, 2012 for International Application No. PCT/GB2011/051954.
(Continued)

*Primary Examiner* — Philip Tucker
*Assistant Examiner* — Vicki Wu
(74) *Attorney, Agent, or Firm* — Bejin Bieneman PLC

(57) ABSTRACT

An example of a composite structure is a containment case 2 for a gas turbine engine 1 which comprises an annular housing 3 and an annular flange 4 which is integral with and is positioned at an end of the housing 3. The housing 3 comprises composite material which includes tape 9 laid in the circumferential direction of the housing. The flange 4 comprises composite material which includes tape 8 laid at an oblique angle to the circumferential direction of the flange 4 and/or tape 7 laid at a perpendicular angle to the circumferential direction. The flange 4 does not include tape 9 laid in the circumferential direction of the flange, because such tape would impede the forming of the flange material to form the flange.

11 Claims, 12 Drawing Sheets

(51) Int. Cl.
*B29C 33/00* (2006.01)
*B29C 33/20* (2006.01)
*B29C 33/48* (2006.01)
*B29C 70/54* (2006.01)
*B29C 70/38* (2006.01)
*B29L 31/00* (2006.01)

(52) U.S. Cl.
CPC ............ *B29C 33/485* (2013.01); *B29C 70/386* (2013.01); *B29C 70/54* (2013.01); *B32B 38/0004* (2013.01); *B29C 70/382* (2013.01); *B29L 2031/7504* (2013.01); *Y10T 156/108* (2015.01)

(56) References Cited

U.S. PATENT DOCUMENTS

| | | | | |
|---|---|---|---|---|
| 6,053,696 | A * | 4/2000 | Roberts | 415/9 |
| 6,814,916 | B2 * | 11/2004 | Willden et al. | 264/257 |
| 2005/0056362 | A1 * | 3/2005 | Benson et al. | 156/163 |
| 2006/0216480 | A1 * | 9/2006 | Weidmann et al. | 428/174 |
| 2006/0226287 | A1 * | 10/2006 | Grantham et al. | 244/119 |
| 2006/0249868 | A1 * | 11/2006 | Brown et al. | 264/163 |

OTHER PUBLICATIONS

Response to Written Opinion for PCT/GB2011/051954 dated Aug. 1, 2012.
Written Opinion of IPRP for PCT/GB2011/051954 dated Oct. 17, 2012.
Further Response to Written Opinion for PCT/GB2011/051954 dated Dec. 13, 2012.
IPRP for PCT/GB2011/051954 dated Jan. 11, 2013.
Search Report dated Nov. 22, 2010 in connection with GB1017121.3.

* cited by examiner

METHOD OF MANUFACTURING A COMPOSITE STRUCTURE AND COMPOSITE STRUCTURE OBTAINED THEREBY

CROSS-REFERENCE TO RELATED APPLICATIONS

This application represents the national stage entry of PCT International Application No. PCT/GB2011/051954 filed Oct. 11, 2011 and claims the benefit of Great Britain Application No. 1017121.3 filed Oct. 11, 2010. The contents of both of these applications are hereby incorporated by reference as if set forth in their entirety herein.

FIELD OF THE INVENTION

The present invention relates to a composite structure such as a containment case for a gas turbine engine, although the present invention is broadly applicable to composite structures such as, in the aerospace industry, winglets (tips of wings designed to reduce drag during flight), aerofoils, pylons, and all barrel-shaped structures including the fuselage and engine components such as the rear fan case and the front fan case.

BACKGROUND

Characteristics of composite materials have meant that composite components are employed in an increasing range of applications from aerospace to automotive parts.

In the aerospace industry, for example, composite materials have been used for a number of years owing to their strength to weight ratio. The term "composite materials" (known also as "composites") is used to describe materials comprising for example glass fibre or carbon fibres and an epoxy resin (or similar). These are also known as glass reinforced plastic or carbon fibre reinforced composites. The carbon fibre reinforced composite material offers improved properties such as lower weight, improved fatigue/damage resistance, corrosion resistance and negligible thermal expansion.

The use of these materials has increased throughout the aerospace industry predominantly because of the fuel savings which can be achieved over the life of an aircraft by reducing the overall sum weight of the components making up the aircraft. Aerodynamic as well as structural components are formed of composite materials and particularly carbon fibre materials.

A composite component is laid-up using a cloth, tape or the like pre-impregnated with resin to form a stack corresponding to the desired shape of the part to be formed. The stack is then cured either at ambient temperature and pressure or at elevated temperature and pressure in an autoclave to create a hardened component.

A gas turbine engine such as a turbofan may be provided with a containment case for preventing a broken blade of the engine from exiting the engine and damaging the rest of the aircraft. For example, a containment case may be provided around the fan at the front of the turbofan engine. The containment case may be made of composite material such as carbon fibre reinforced composite material and/or Kevlar reinforced composite material. The containment case is in the shape of a generally cylindrical barrel or housing. The containment case needs to be attached to adjacent structural components of the engine and it is therefore desirable for the containment case to include a flange at one or both of the ends of the barrel or housing.

It is convenient to use a machine, such as an automated tape laying (ATL) machine, to lay-up the plies of composite material of the housing of the containment case on a mould or mandrel. It has proved difficult to use a machine to lay-up the plies of the composite material of the flange and to integrate the composite material of the flange with the composite material of the housing, before the housing and the flange are cured. It has proved necessary to manually lay-up the plies of the flange, ply by ply, against an outwardly-projecting annular wall of the mould which extends outward from the main cylindrical mould surface on which the plies of the housing have been machine-laid up. The plies of the flange are hand laid and must be intermeshed with the machine-laid plies of the housing. This tends to produce a flange of inconsistent quality and, in order to compensate for this, a flange which is heavier than it needs to be because it is using an excess of composite material.

As an alternative to using composite, large-diameter containment cases may be machined from a metal such as titanium, so that the flange can be integral with the housing or barrel. However, a titanium fan case is significantly heavier and more expensive than a composite fan case.

The composite containment or fan case described above offers a weight advantage compared with titanium but, in order to have the advantage of the structural integrity resulting from the composite flange being integral with the composite housing of the containment case, there is the disadvantage described above of still having to use manual or hand laying of the flange in order to integrate the flange with the machine-laid housing or barrel.

Generally in relation to composite structures (as well as in relation to the particular example of a containment case), it would be desirable to have a configuration during the laying-up of the composite material which facilitates machine laying of the flange in addition to machine laying of the curved main surface of the composite structure (the housing of the containment case). In this way, all of the laying-up of the composite material could be automated, and it would no longer be necessary to use manual or hand laying. Automating the laying-up of the flange should also produce an improvement in the quality of the flange and the composite structure (the containment case).

SUMMARY OF THE INVENTION

According to a first aspect of the present invention, there is provided a method of manufacturing a composite structure, wherein the composite structure comprises a curved main surface and a radially outwardly extending flange which is positioned along a first edge of the main surface, the method comprising the steps of:

laying-up a main zone of composite material on a curved surface of a mould, wherein the shape of the main zone corresponds to the shape of the main surface of the composite structure and the composite material of the main zone includes tape laid generally parallel to the first edge of the main surface;

laying-up a secondary zone of composite material on the curved surface of the mould, wherein the composite material of the secondary zone is adjacent and integral with the composite material of the main zone and the composite material of the secondary zone includes tape laid at an oblique and/or perpendicular angle to the first edge of the main surface but does not include tape laid generally parallel to the first edge of the main surface;

forming the composite material of the secondary zone to form the radially outwardly extending flange of the composite structure; and curing the composite material.

Thus, during the laying-up, the configuration of the composite material that is to form the flange facilitates the machine laying-up of that composite material. In our preferred embodiment, a machine such as an ATL machine may be used to lay-up all of the composite material of the composite structure.

Because the secondary zone of composite material that will form the flange does not include tape laid generally parallel to the first edge of the main surface (e.g. in the circumferential direction of a barrel-shaped composite structure), it does not resist the forming that occurs during the forming step that forms the flange.

Thus, in relation to the example of a barrel-shaped composite structure, the composite material that will form the housing or barrel does include tape laid in the circumferential direction of the mould, and thus the housing or barrel will have the necessary hoop (circumferential) strength.

The method of the present invention is particularly suited for making large-diameter containment cases, such as those where the diameter of the housing of the containment case is from 2 to 3 m, such as are required for the fan cases of large turbofans used on large (e.g. passenger) aircraft.

The flange, when it is extending radially outwardly, may be considered as having a proximal portion (or heel) which is joined to the main surface and a distal portion (or toe) which forms a free edge remote from the main surface and having a radius of curvature (e.g. diameter) greater than the radius of curvature (e.g. diameter) of the main surface. The difference in radius of curvature (e.g. diameter) between the distal portion of the flange and the proximal portion of the flange is fairly small when the composite structure is a barrel-shaped structure such as a containment case of the large-diameter type, e.g. 2 m or more. A typical current barrel diameter range would be 2 to 3 m for current turbofan engines.

In the forming step, the small difference in diameter between the distal and proximal portions of the flange of a large-diameter containment case means that the tapes in the secondary zone that are to form the flange do not have to splay apart that much from one another in the circumferential direction as the forming step occurs.

In particular, in our preferred embodiment, the perpendicular (90°) angle tapes that are to form the flange only need to splay apart from one another to a small extent as the forming step occurs, and this splaying apart is easily accomplished as the forming step progresses. The resulting gaps between the 90° tapes of the flange are comparatively small. If the flange has a thickness which contains a large number of tape plies, a gap between any particular two tapes of the formed flange will be covered by another tape at a different depth in the thickness of the flange.

Although these small gaps do exist between the formed tapes of the flange of our preferred embodiment, they do not significantly weaken the ability of the composite structure at the location of the flange to resist hoop (circumferential) loading because the increased radial depth of composite material at the first edge of the main surface resulting from the presence of the formed flange provides sufficient strength along the first edge.

Also in our preferred embodiment, the composite material of the main zone is laid-up on a static portion of the mould and the composite material of the secondary zone is laid-up on movable portion(s) of the mould; and the forming step comprises radially outwardly moving the movable portion(s) of the mould.

The movable portions of the mould may, for example, be blocks which are spaced apart along the first edge and can be moved from a retracted configuration to a radially outwardly-advanced configuration. A flexible membrane may be positioned between the blocks and the composite material of the secondary zone so that, when the blocks are advanced to their advanced position, the resulting gaps between the blocks are spanned by the membrane.

In our preferred embodiment, the composite material of the main zone and the composite material of the secondary zone each include tape laid at an oblique angle to the first edge of the main surface. Preferably, a tape laid at an oblique angle in the main zone extends into the secondary zone in order to assist with providing the integral connection between the composite material of the main zone and the composite material of the secondary zone.

For example, the tape laid at an oblique angle to the first edge of the main surface is laid at an included angle relative to the first edge of 10° to 80°. As an alternative to this range, the range may be 20° to 70°, or 30° to 60°. In a particularly preferred embodiment, all of the oblique-angle tapes are laid at an included angle relative to the first edge (e.g. the circumferential direction) of substantially 60°.

In our preferred embodiment, the composite material of the secondary zone includes tape laid at an oblique angle to the first edge of the main surface and tape laid at a perpendicular angle to the first edge. In other words, the composite material that is to form the flange contains both types of tape. The oblique-angle tape assists with the eventual flange being able to handle hoop (circumferential) loads.

In our preferred embodiment, the main zone includes a central part and an edge part which is adjacent the secondary zone; the composite material of the central part of the main zone includes tape laid generally parallel to the first edge of the main surface but does not include tape laid at a perpendicular angle to the first edge; and the composite material of the edge part of the main zone includes tape generally parallel to the first edge of the main surface and tape laid at a perpendicular angle to the first edge.

Thus, there is a gradual transition in characteristics from the central part of the main zone to the edge part of the main zone and to the secondary zone itself. This gradual transition helps to structurally integrate the secondary zone with the main zone because the perpendicular tapes can run from the edge part into the secondary zone.

In our preferred embodiment, the method further comprises the step of trimming the flange to give the free (e.g. annular) edge of the flange a predetermined height (e.g. diameter).

The trimming step may be performed before or after the curing step. For example, after the curing step, the flange may be machined to remove the roughness of the free edge (the distal portion) of the flange.

In our preferred embodiment, the trimming step comprising removing between 20% and 80% of the height of the flange. As an alternative to this range, the range may be 30% to 70%, or 40% to 60%. The trimming helps to ensure that the remaining part of the flange has fewer voids left from the splaying apart of the free ends of the tapes in the flange that results from the flexing of the composite material in the forming step.

In our preferred embodiment, the composite material is heated to a first temperature and the forming step is performed; and the composite material is then heated to a second temperature higher than the first temperature.

The heating to the first temperature helps the tapes of the secondary zone to slip over one another during the flexing of the forming step.

The subsequent heating to the second, higher temperature is then used to perform or complete the curing step. The heating to the first temperature may conveniently be the first part of the curing operation.

The first temperature may, for example, be between 40° and 100° C., or between 50° and 90° C., or between 60° and 80° C. In our current embodiment, we use 80° C.

The second temperature made be 120° C. or higher. In our current embodiment, we use a temperature of about 135° C.

In our preferred embodiment, the method further comprises the step of forming fastener holes in the flange. The fastener holes may be formed after the curing step and after the trimming step. In our preferred embodiment, the fastener holes are circumferentially spaced apart around the flange.

In our preferred embodiment, the main zone and the secondary zone are each laid-up with tape such that the depth of tape plies is at least 10 plies. Alternatively, the ply depth may be at least 20 plies or at least 30 plies. Preferably, the ply depth is uniform across the main zone and the secondary zone.

According to a second aspect of the present invention, there is provided a composite structure comprising a curved main surface and a radially outwardly extending flange which is integral with and is positioned along a first edge of the main surface, wherein:

the main surface comprises composite material which includes tape laid generally parallel to the first edge of the main surface; and the flange comprises composite material which includes tape laid at an oblique and/or perpendicular angle to the first edge of the main surface but does not include tape laid generally parallel to the first edge of the main surface.

According to a third aspect of the present invention, there is provided a method of manufacturing a containment case for a gas turbine engine, wherein the containment case comprises an annular housing and a flange which is positioned at an end of the housing and projects radially away from the housing, the method comprising the steps of:

laying-up a main annular zone of composite material on an outer peripheral surface of a mould, wherein the shape of the main zone corresponds to the shape of the annular housing of the containment case and the composite material of the main zone includes tape laid in the circumferential direction of the mould;

laying-up a secondary annular zone of composite material on the outer peripheral surface of the mould, wherein the composite material of the secondary zone is adjacent and integral with the composite material of the main zone and the composite material of the secondary zone includes tape laid at an oblique and/or perpendicular angle to the circumferential direction of the mould but does not include tape laid in the circumferential direction;

forming the composite material of the secondary zone to form the flange of the containment case; and curing the composite material.

According to a fourth aspect of the present invention, there is provided a containment case for a gas turbine engine, comprising an annular housing and an annular flange which is integral with and is positioned at an end of the housing and projects radially away from the housing, wherein:

the housing comprises composite material which includes tape laid in the circumferential direction of the housing; and the flange comprises composite material which includes tape laid at an oblique and/or perpendicular angle to the circumferential direction of the flange but does not include tape laid in the circumferential direction of the flange.

In relation the third and fourth aspects of the present invention, the preferred features discussed above in relation to the first and second aspects of the present invention are also applicable, mutatis mutandis.

BRIEF DESCRIPTION OF THE DRAWINGS

Embodiments of the present invention will now be described, by way of example only, with referenced to the accompanying drawings in which.

Figure 1:
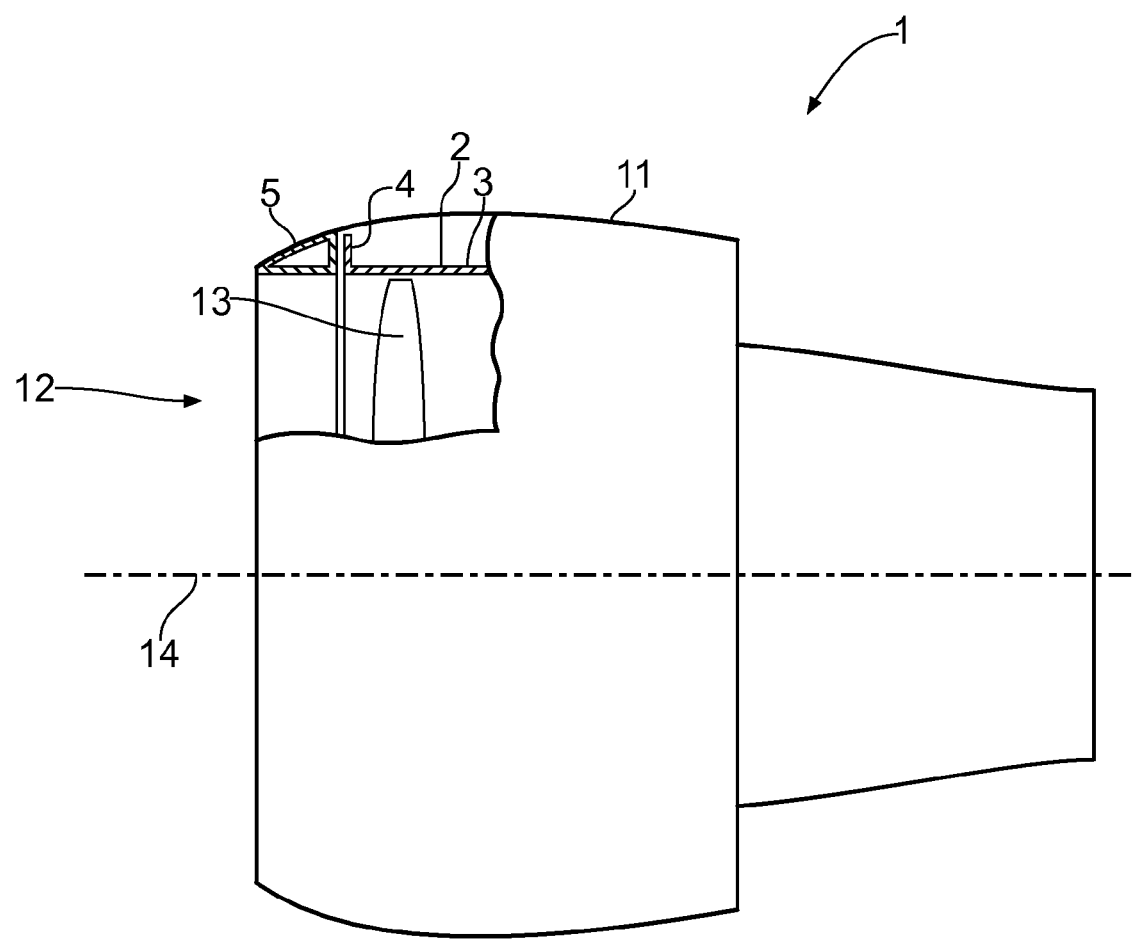
FIG. 1 is a diagrammatic side view of a turbofan engine, partly cut away to show a containment case and a fan blade.

While the invention is susceptible to various modifications and alternative forms, specific embodiments are shown by way of example in the drawings and are herein described in detail. It should be understood, however, that the drawings and detailed description of the specific embodiments are not intended to limit the invention to the particular forms disclosed. On the contrary, the invention is covering all modifications, equivalents and alternatives falling within the spirit and the scope of the present invention as defined by the appended claims.

DESCRIPTION OF EMBODIMENTS

FIG. 1 shows a turbofan engine 1 having a fan case 11 defining a fan duct 12 which contains a rotating disc of fan blades 13.

The fan blades 13 rotate around a central longitudinal axis 14 of the engine 1.

The fan case 11 is annular and is centred on the longitudinal axis 14. The fan case 11 is shown partly cut away in FIG. 1 in order to diagrammatically illustrate the fact that the fan case 11 includes an annular containment case 2 positioned around the periphery of the disc of fan blades 13 in order to contain any broken fan blade 13. The containment case 2 comprises a generally-cylindrical barrel or housing 3 at the front end of which is an outwardly-extending annular flange 4.

The containment case 2 is centred on the longitudinal axis 14 of the engine 1 and is held in position by being fastened to other components of the fan case 11 such as an annular front leading edge 5. The flange 4 may be provided with holes for fasteners which are used to attach the containment case 2 to the structure of the leading edge 5.

FIGS. 2 to 6 show, in a very simplified and diagrammatic manner, the sequence of manufacturing steps used to make the containment case 2. The barrel or housing 3 has a flange 4 at its front end and its rear end. For reasons of clarity, only one of the flanges 4 is shown in the figures.

The housing 3 is annular and is generally-cylindrical in shape with a circular cross-section. The housing 3 is made of composite material such as carbon fibre reinforced composite material and/or Kevlar reinforced composite material. The flange 4 is made of the same composite material. The composite material of the housing 3 and the flange 4 is pre-impregnated uni-directional tape containing any suitable resin (e.g. epoxy resin) as is well known. Such tape may be automatically laid on a mould by an automated machine having a tape-laying head which operates under computer control. The computer controls the rotation of the generally-cylindrical mould or mandrel, in addition to controlling the orientation of the tape-laying head relative to the mould and movement of the head along the longitudinal axis of the mould. Such a machine is known as an automated tape laying (ATL) machine. Such a machine is readily able to lay-up tape having a typical width of 75 mm to 150 mm as is conveniently used when forming a large-diameter containment case having a diameter of the order of 2 m. In our preferred embodiments, only tape is used as the composite material.

Figure 2:
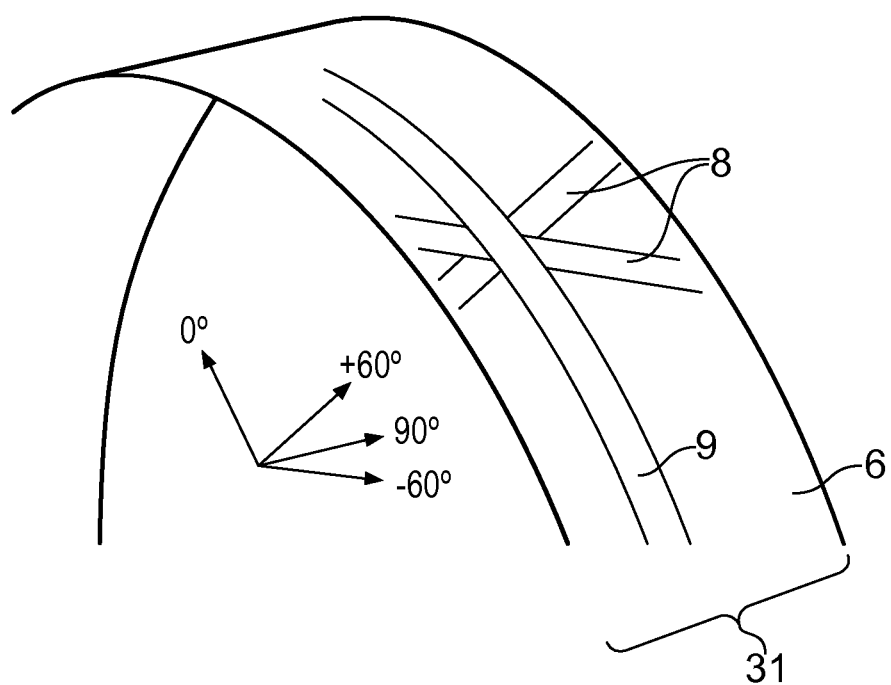
FIGS. 2 to 6 depict, in a simplified example, the sequence of steps of a manufacturing method for a containment case in accordance with the present invention.

Referring to FIGS. 2 to 6, it is the case that FIG. 2 is a diagrammatic and simplified perspective view showing part of a mould or mandrel 6 and part of the initial lay-up of tape plies. In FIG. 2, the indicated 0° direction refers to the circumferential direction of the mould 6. The indicated 90° direction is a direction perpendicular to the circumferential direction of the mould 6. The indicated plus 60° and minus 60° directions are oblique directions relative to the circumferential direction of the mould 6.

Figure 3:
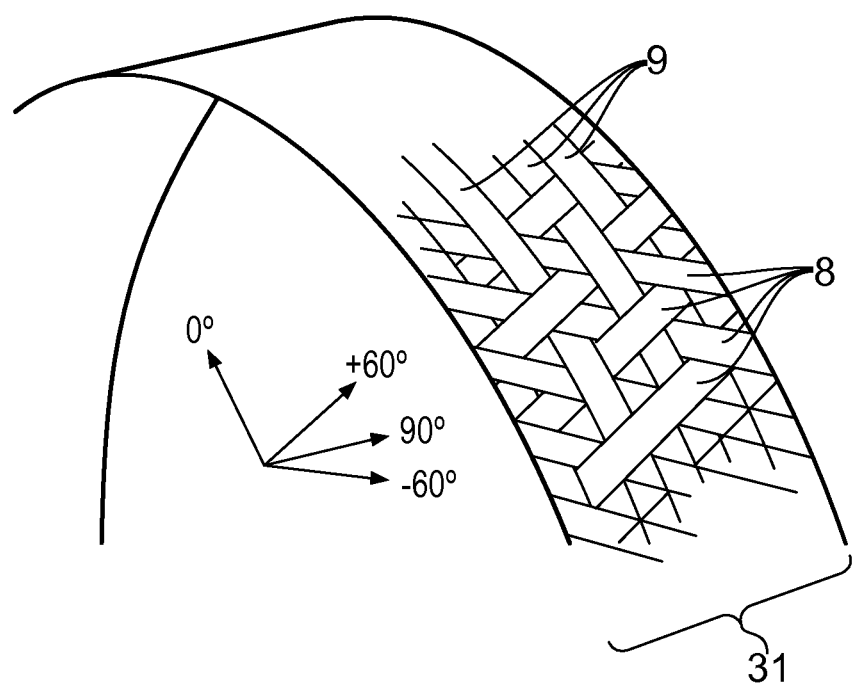

A more complete stage of the tape lay-up is shown in FIG. 3. In FIG. 3, the depicted tape plies are those that form the housing 3.

Figure 4:
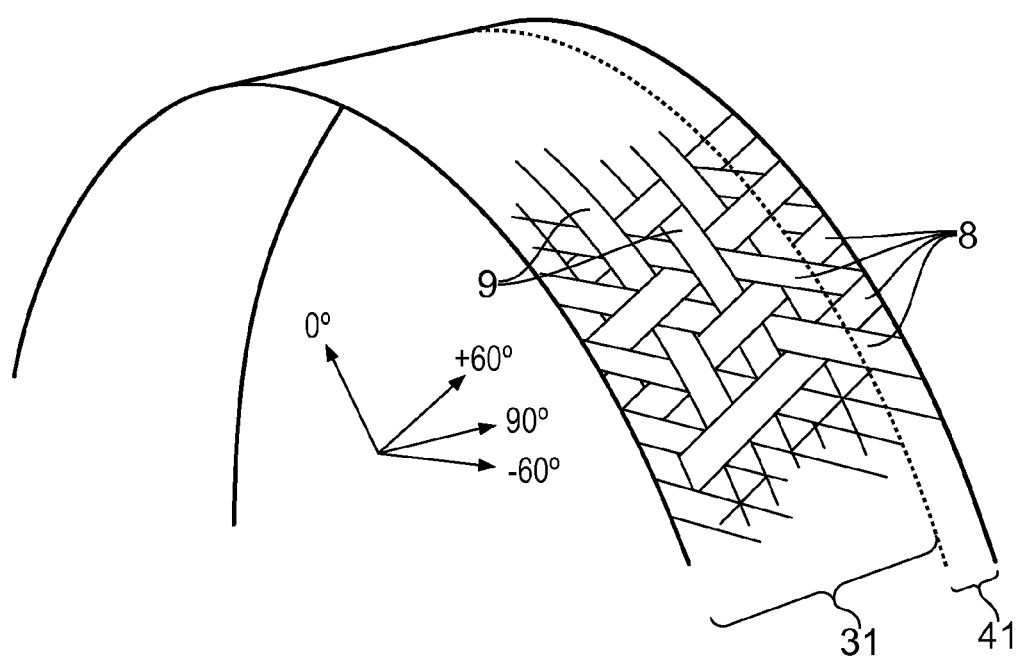

In FIG. 4, the laid-up tape plies which will form the flange 4 are shown in addition to the laid-up tape plies of the housing 3. Specifically, there is a main annular zone 31 of laid-up tape which will form the housing 3. There is also a secondary annular zone 41 of laid-up tape which will in due course be formed or raised to form the flange 4. The secondary zone 41 is adjacent and integral with the main zone 31 because the plus 60° and minus 60° tapes continue from the main zone 31 into the secondary zone 41. In fact, the plus 60° and minus 60° tapes extend the full length of the containment case 2 (the full length of the housing 3 and the flange 4). This may be seen in FIG. 4. It may also be seen that the main zone 31 includes 0° (circumferential) tapes but that the secondary zone 41 does not include any 0° (circumferential) tapes. This is because, if circumferential tapes were to be present in the secondary zone 41, they would prevent the secondary zone 41 from being formed in due course to form the flange 4 because the circumferential tapes cannot be stretched in the circumferential direction to accommodate the increase in diameter of the secondary zone 41 that occurs as it is formed outwardly to form the flange 4.

Figure 5:
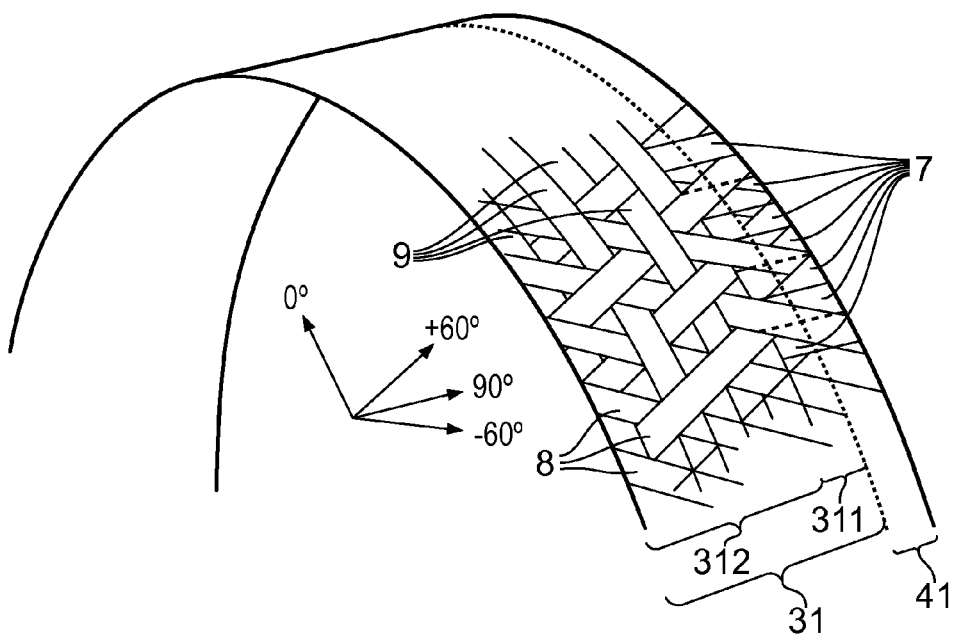

FIG. 5 shows a further stage in the tape lay-up. It shows how 90° (perpendicular) tapes are incorporated into the lay-up of the secondary zone 41, and that these 90° (perpendicular) tapes extend a short distance into an edge part 311 of the main zone 31 which is immediately adjacent the secondary zone 41. The 90° (perpendicular) tapes do not extend beyond the edge part 311 into a central or main part 312 of the main zone 31 (see FIG. 5).

Figure 6:
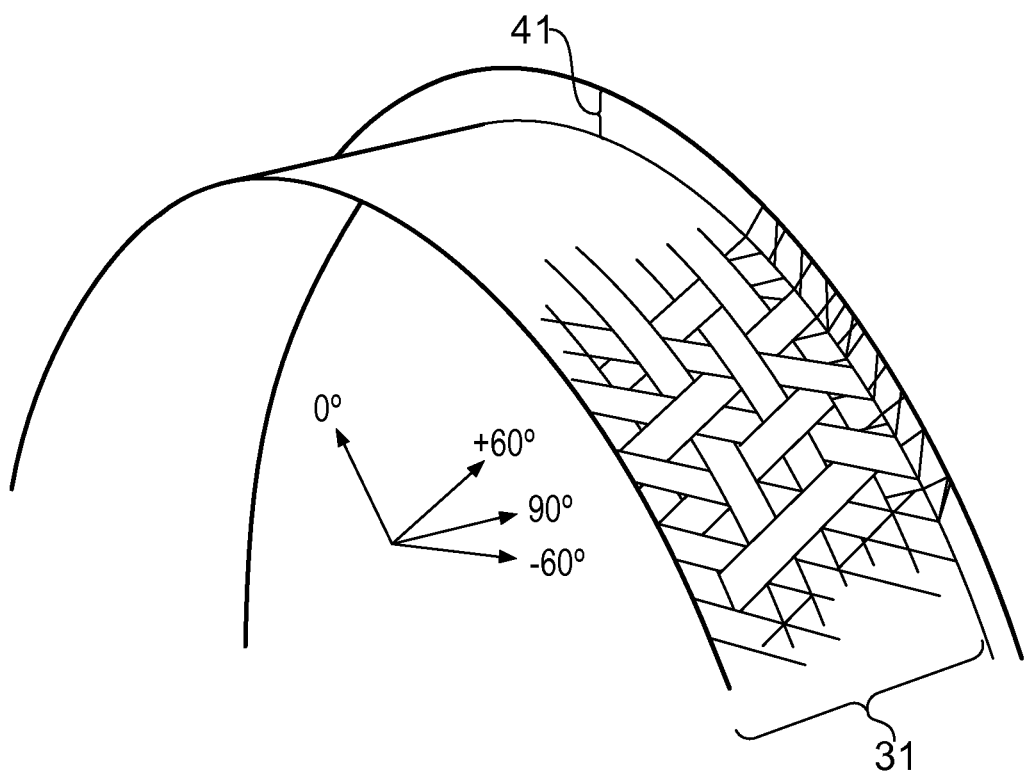

The next stage of the manufacturing process is shown in FIG. 6, which show how a tool has been used to form radially outwardly the secondary zone 41 to form the flange 4.

Figure 7:
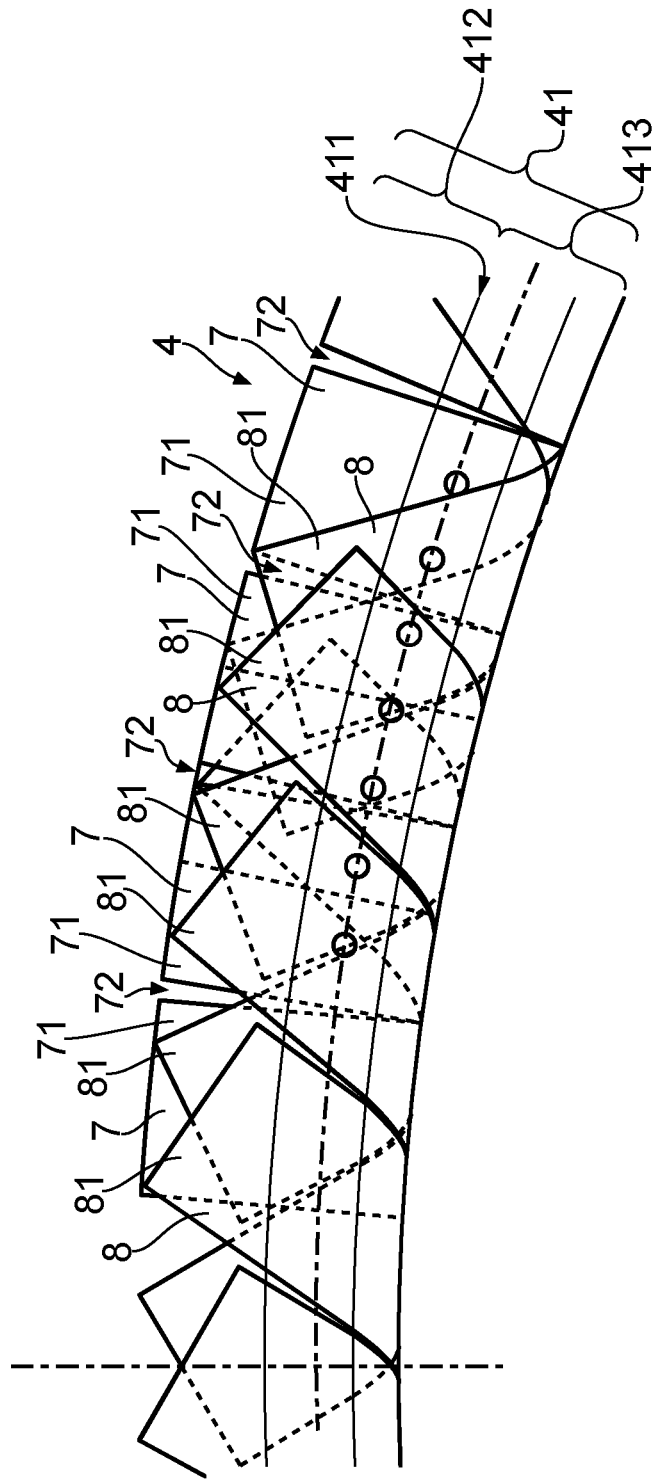
FIG. 7 is a simplified end view showing some of the tape plies of a formed flange of a containment case in accordance with the present invention.

FIG. 7 is a diagrammatic end view that shows a small number of the ply layers of the outwardly-formed secondary zone 41 which form the flange 4. It may be seen that, in relation to the 90° (perpendicular) tapes 7, they have free ends 71 which have splayed apart slightly during the outward forming to leave small gaps 72. FIG. 7, as already mentioned, shows only a couple of ply layers. In relation to a tape lay-up which, in our preferred embodiment, has typically in excess of 20 ply layers, the gaps 72 at a particular depth in the thickness of the flange 4 will be covered, at different depths, by the free ends 71 of other tapes 7, or by the free ends 81 of some of the plus 60° or minus 60° tapes 8.

There is an excess of tape material when the flange 4 is formed. After the curing step, the excess material may be trimmed at a height 411 so as to remove the unwanted excess tape material 412 and to leave behind the final version 413 of the flange 4. This trimming operation has the beneficial effect of reducing the size of the gaps 72 that remain in the flange 4.

Figure 8:
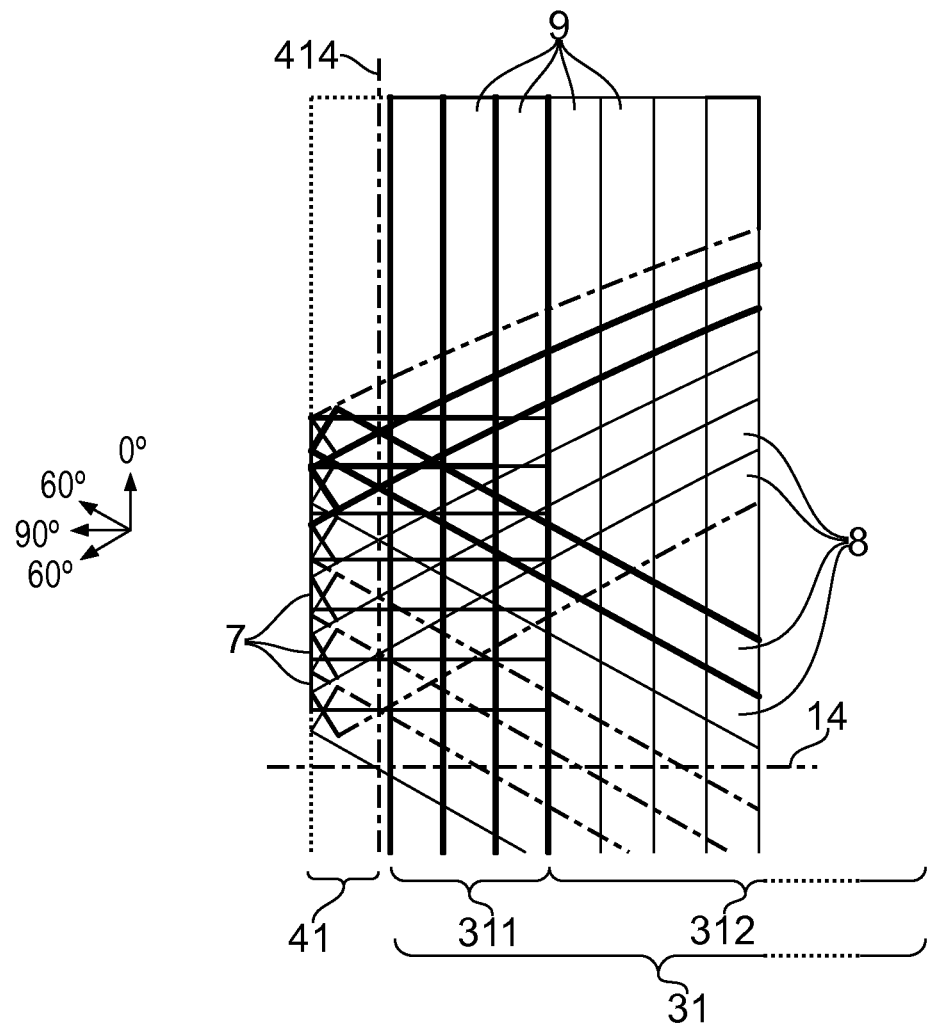
FIG. 8 is a developed view showing the transition of the tape plies between the housing or barrel of the containment case and the flange of the containment case, prior to forming of the flange.

FIG. 8 is a developed view showing part of the junction between the main annular zone 31 and the secondary annular zone 41. FIG. 8 shows the flexing line 414 which is a circumferential line along which a forming tool functions to outwardly form the secondary annular zone 41 to form a flange.

Figure 9:
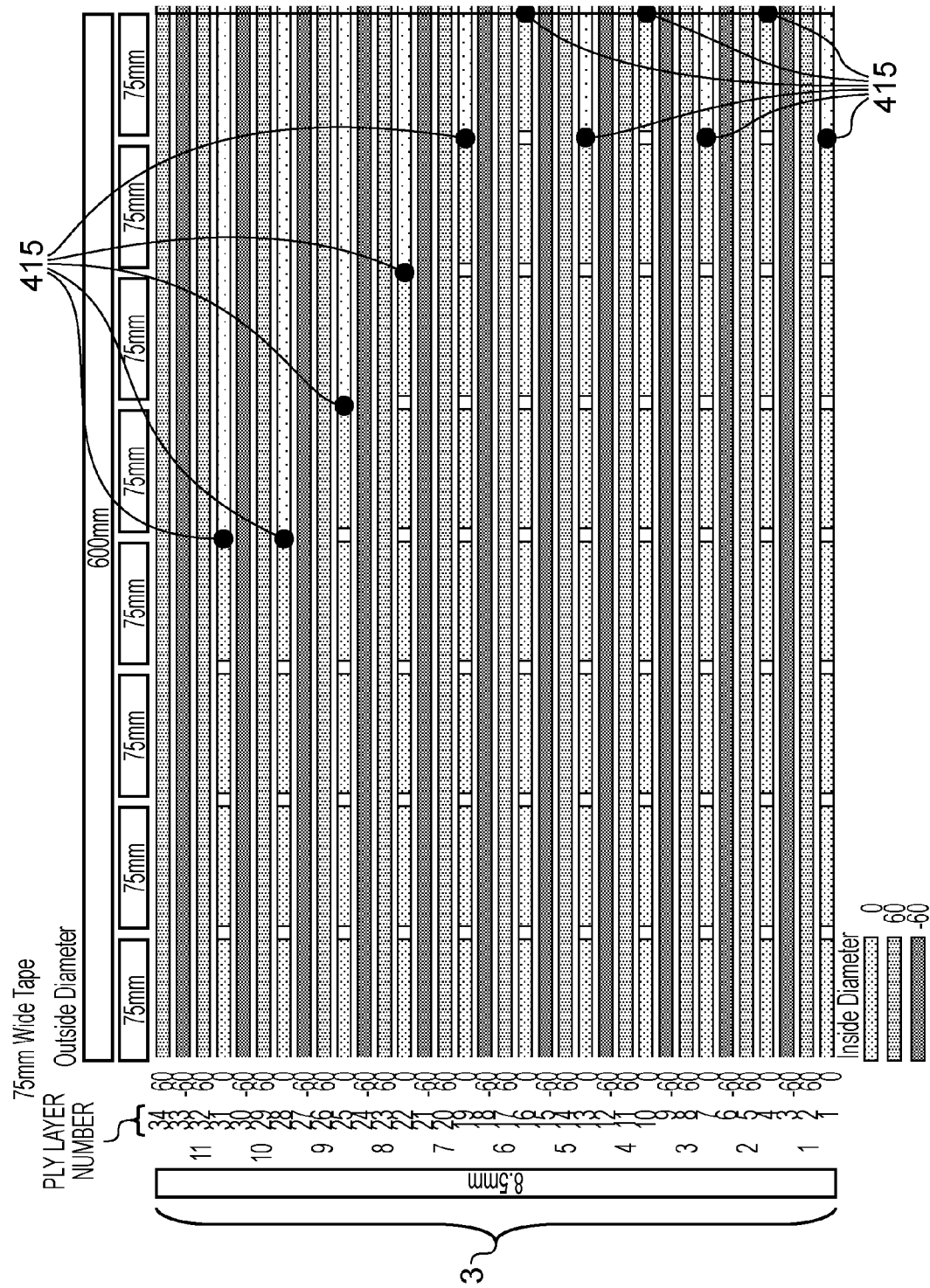
FIG. 9 is a diagrammatic cross-sectional view showing the different directions of the tape plies at the junction between the housing and the flange of a containment case in accordance with the present invention.
Figure 9:
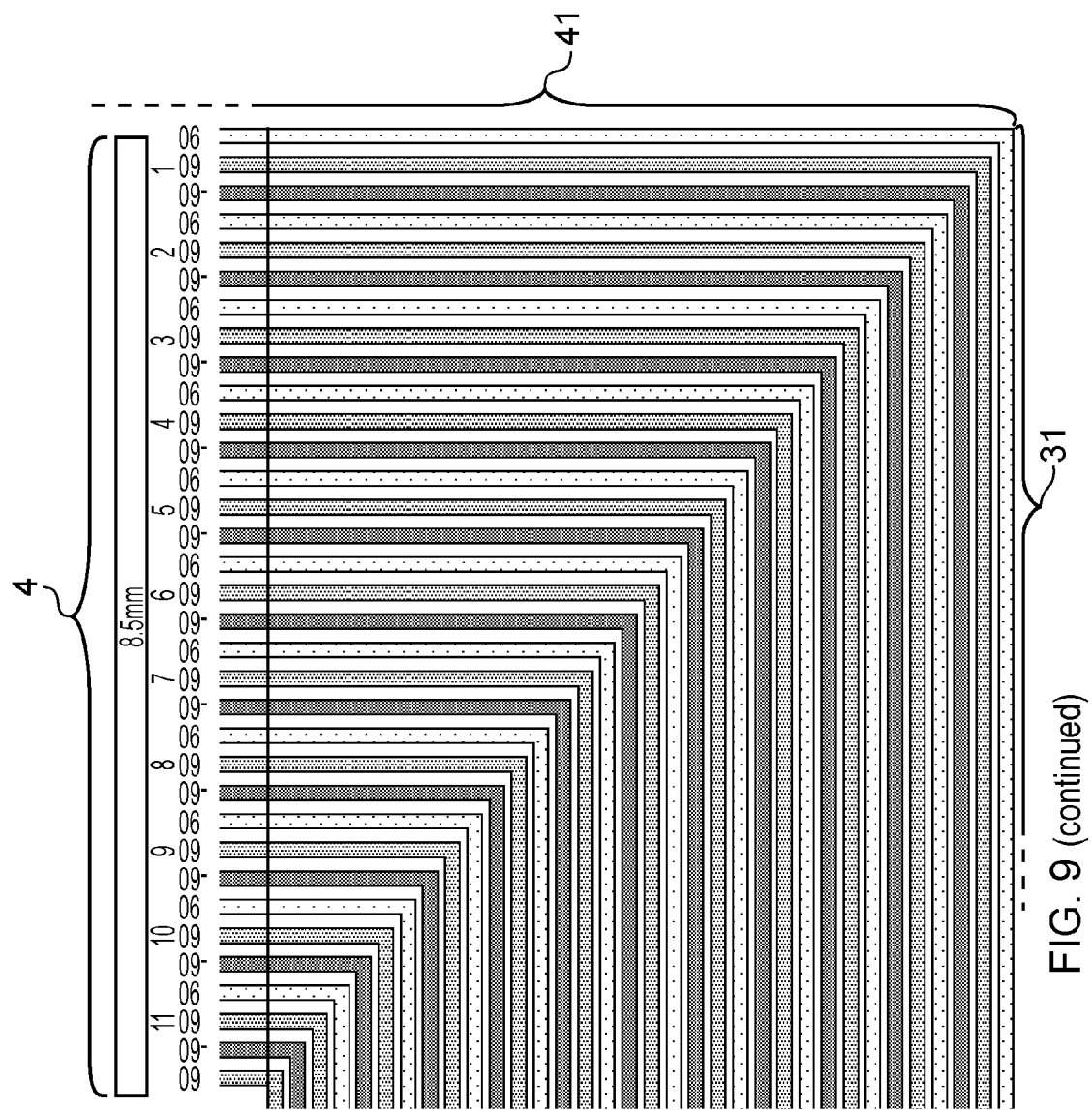
Figure 10:
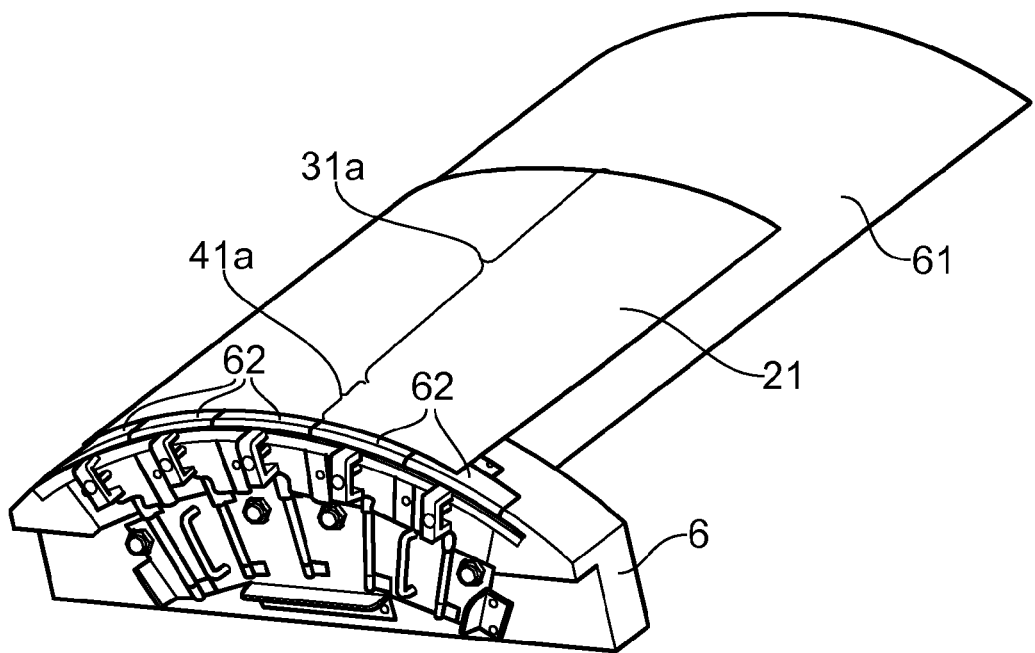
FIGS. 10 and 11 are perspective views showing two stages in the use of an experimental tool for forming a flange.
Figure 11:
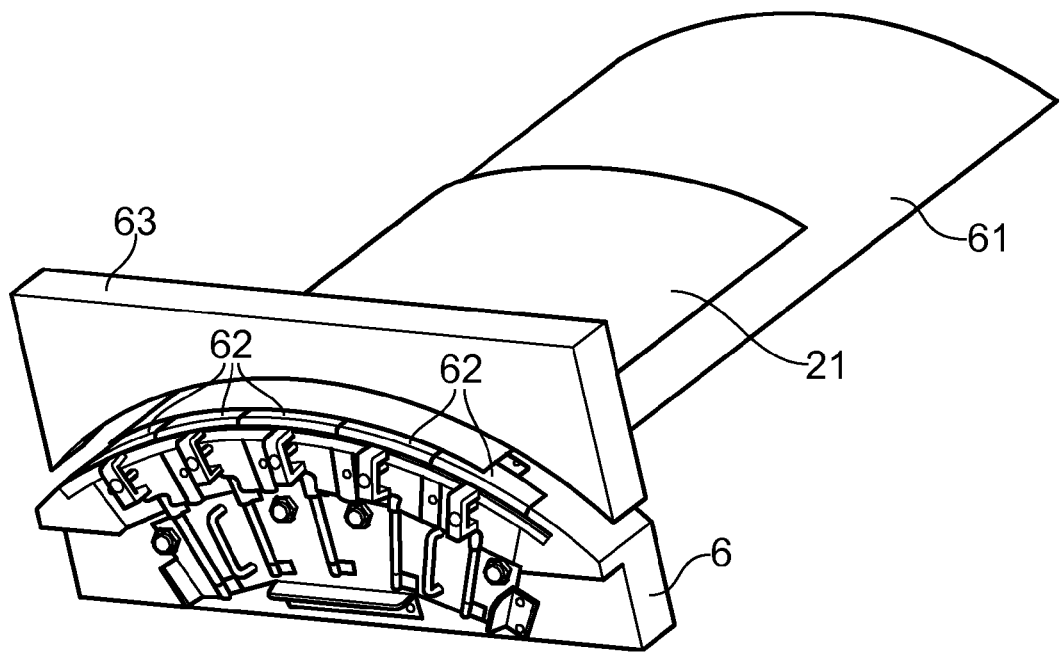
Figure 12:
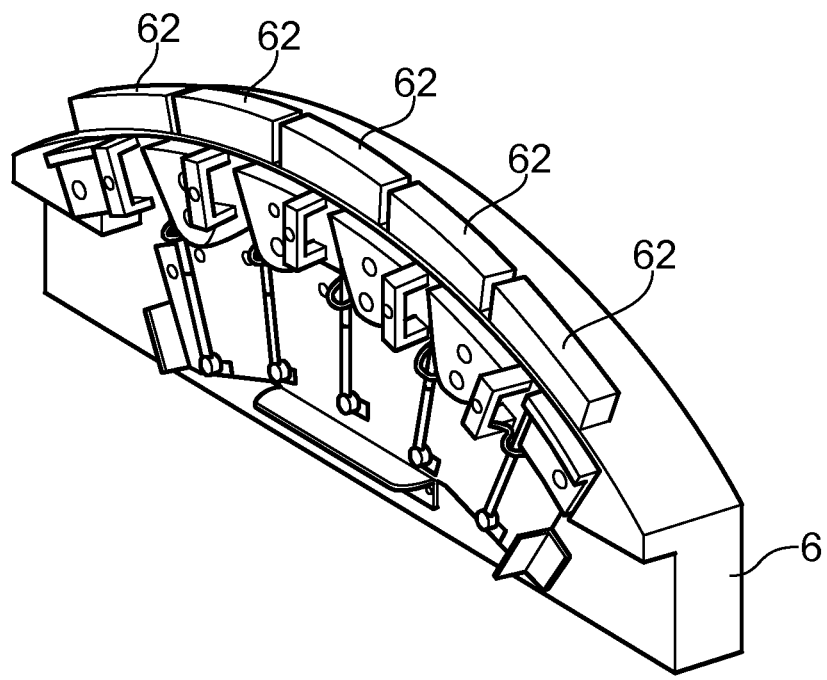
FIGS. 12 and 13 are perspective and end views respectively of the movable blocks of the experimental tool which are used to form the flange.
Figure 13:
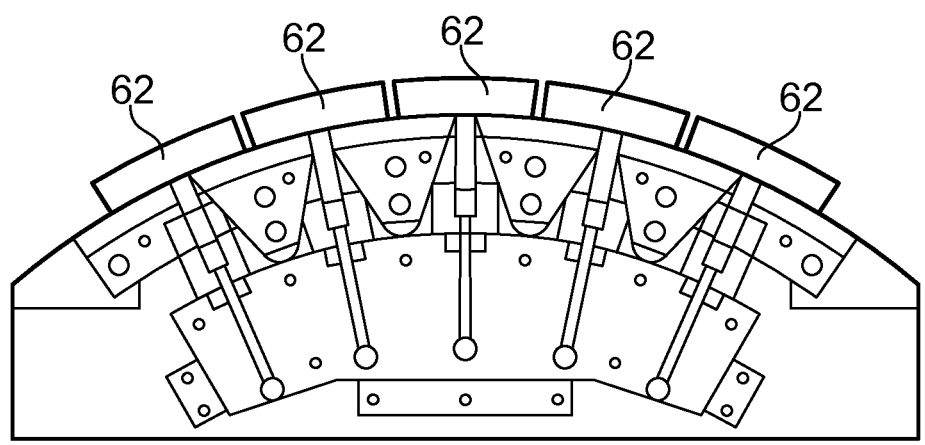

FIG. 9 is a very diagrammatic cross-sectional depiction of the 34 ply layers at the junction between the housing 3 and the flange 4.

Two out of every three of the depicted 34 tape plies comprise only plus 60° or minus 60° tapes.

Every third tape ply comprises, in the main annular zone 31, 0° (circumferential) tapes which transition, at a respective transition point 415, to being 90° (perpendicular) tapes which continue from the main zone 31 round into the secondary zone 41 of the flange 4.

In FIG. 9, there are 34 tape ply layers. Each tape is approximately 0.25 mm thick. This gives an approximate thickness of 8.5 mm to the housing 3, and an approximate thickness of 8.5 mm to the flange 4. This is based on using tape having a width of 75 mm.

An experimental tool for forming the secondary zone 41 to form the flange 4 is shown in FIGS. 10 to 13. The experimental tool incorporates a part 61 of the cylindrical mould or mandrel 6. An experimental part 21 of the containment case 2 is formed on the mould surface 61. This comprises an experimental secondary zone 41a and an experimental main zone 31a. The experimental part 21 is placed into a diaphragm of a vacuum bag (not shown) before it is positioned on the mould surface 61. Movable blocks 62 of the mould 6 are covered with another vacuum diaphragm (not shown). The diaphragm material does not project beyond the circumferential edge formed by the blocks 62.

A female mould tool 63 (see FIG. 11) is then clamped down onto the part of the main zone 31a immediately adjacent the secondary zone 41a.

The mould 6 is then placed in an oven and heated to a first temperature, e.g. 80° C., at which the resin of the pre-preg tape making up the composite material of the experimental part 21 becomes fluid enough (has a low enough viscosity) to facilitate the forming operation which is about to occur. At this point, the blocks 62 are advanced from their retracted or flush position to the advanced position shown in FIGS. 12 and 13. This flexes upwards the secondary zone 41a to form a flange projecting outwards relative to the main zone 31a.

The temperature in the oven is then raised to a second, higher temperature in order to continue and complete the curing of the composite tape material. For example, the second temperature may be 135° C. After the curing cycle or process has been completed, the blocks 62 may be retracted to the position shown in FIGS. 10 and 11. The female tool 63 may be removed, and the experimental part 21 may be taken out of its vacuum bag.

There has been described a method of manufacturing embodiments of a composite structure 2, wherein the composite structure 2 comprises a curved main surface 3 and a radially outwardly extending flange 4 which is positioned along a first edge 311 of the main surface 3, the method comprising the steps of: laying-up a main zone 31 of composite material on a curved surface 61 of a mould 6, wherein the shape of the main zone 31 corresponds to the shape of the main surface 3 of the composite structure 2 and the composite material of the main zone 31 includes tape 9 laid generally parallel to the first edge 311 of the main surface 3; laying-up a secondary zone 41 of composite material on the curved surface 61 of the mould 6, wherein the composite material of the secondary zone 41 is adjacent and integral with the composite material of the main zone 31 and the composite material of the secondary zone 41 includes tape 7, 8 laid at an oblique and/or perpendicular angle to the first edge 311 of the main surface 3 but does not include tape 9 laid generally parallel to the first edge 311 of the main surface 3; forming the composite material of the secondary zone 41 to form the radially outwardly extending flange 4 of the composite structure 2; and curing the composite material.

There has also been described a method of manufacturing embodiments of a containment case 2 for a gas turbine engine 1, wherein the containment case 2 comprises an annular housing 3 and a flange 4 which is positioned at an end of the housing 3 and projects radially away from the housing 3, the method comprising the steps of: laying-up a main annular zone 31 of composite material on an outer peripheral surface 61 of a mould 6, wherein the shape of the main zone 31 corresponds to the shape of the annular housing 3 of the containment case 2 and the composite material of the main zone 31 includes tape 9 laid in the circumferential direction of the mould 6; laying-up a secondary annular zone 41 of composite material on the outer peripheral surface 61 of the mould 6, wherein the composite material of the secondary zone 41 is adjacent and integral with the composite material of the main zone 31 and the composite material of the secondary zone 41 includes tape 7, 8 laid at an oblique and/or perpendicular angle to the circumferential direction of the mould 6 but does not include tape 9 laid in the circumferential direction; forming the composite material of the secondary zone 41 to form the flange 4 of the containment case 2; and curing the composite material.

There have also been described embodiments of a composite structure 2 comprising a curved main surface 3 and a radially outwardly extending flange 4 which is integral with and is positioned along a first edge 311 of the main surface 3, wherein: the main surface 3 comprises composite material which includes tape 9 laid generally parallel to the first edge 311 of the main surface 3; and the flange 4 comprises composite material which includes tape 7, 8 laid at an oblique and/or perpendicular angle to the first edge 311 of the main surface 3 but does not include tape 9 laid generally parallel to the first edge 311 of the main surface 3.

There have also been described embodiments of a containment case 2 for a gas turbine engine 1, comprising an annular housing 3 and an annular flange 4 which is integral with and is positioned at an end of the housing 3 and projects radially away from the housing 3, wherein: the housing 3 comprises composite material which includes tape 9 laid in the circumferential direction of the housing 3; and the flange 4 comprises composite material which includes tape 7, 8 laid at an oblique and/or perpendicular angle to the circumferential direction of the flange 4 but does not include tape 9 laid in the circumferential direction of the flange 4.

The invention claimed is:

1. A method of manufacturing a composite structure, wherein the composite structure comprises a curved main surface and a radially outwardly extending flange which is positioned along a first edge of the main surface, the method comprising the steps of:
   laying-up a main zone of composite material on a curved surface of a mould, wherein the shape of the main zone corresponds to the shape of the main surface of the composite structure and the composite material of the main zone includes tape laid substantially parallel to the first edge of the main surface;
   laying-up a secondary zone of composite material on the curved surface of the mould, wherein the composite material of the secondary zone is adjacent and integral with the composite material of the main zone and the composite material of the secondary zone includes tape laid at an oblique angle to the first edge of the main surface and tape laid at a perpendicular angle to the first edge of the main surface but does not include tape laid substantially parallel to the first edge of the main surface;
   forming the composite material of the laid-up secondary zone to form the radially outwardly extending flange of the composite structure; and
   curing the composite material.

2. A method according to claim 1, wherein:
   the composite material of the main zone is laid-up on a static portion of the mould and the composite material of the secondary zone is laid-up on movable portion(s) of the mould; and
   the forming step comprises radially outwardly moving the movable portion(s) of the mould.

3. A method according to claim 1, wherein the composite material of the main zone includes tape laid at an oblique angle to the first edge of the main surface.

4. A method according to claim 1, wherein the tape laid at an oblique angle to the first edge of the main surface is laid at an included angle relative to the first edge of 10° to 80°.

5. A method according to claim 1, wherein:
   the main zone includes a central part and an edge part which is adjacent the secondary zone;
   the composite material of the central part of the main zone includes tape laid substantially parallel to the first edge of the main surface but does not include tape laid at a perpendicular angle to the first edge; and
   the composite material of the edge part of the main zone includes tape laid substantially parallel to the first edge of the main surface and tape laid at a perpendicular angle to the first edge.

6. A method according to claim 1, further comprising the step of trimming the flange to give the free edge of the flange a predetermined height.

7. A method according to claim 6, wherein the trimming step comprises removing between 20% and 80% of the height of the flange.

8. A method according to claim 1, wherein:
the composite material is heated to a first temperature and the forming step is performed; and
the composite material is then heated to a second temperature higher than the first temperature.

9. A method according to claim 1, further comprising the step of forming fastener holes in the flange.

10. A method according to claim 1, wherein the main zone and the secondary zone are each laid-up with tape such that the depth of tape plies is at least 10 plies.

11. A method of manufacturing a containment case for a gas turbine engine, wherein the containment case comprises an annular housing and a flange which is positioned at an end of the housing and projects radially away from the housing, the method comprising the steps of:
laying-up a main annular zone of composite material on an outer peripheral surface of a mould, wherein the shape of the main zone corresponds to the shape of the annular housing of the containment case and the composite material of the main zone includes tape laid in the circumferential direction of the mould;
laying-up a secondary annular zone of composite material on the outer peripheral surface of the mould, wherein the composite material of the secondary zone is adjacent and integral with the composite material of the main zone and the composite material of the secondary zone includes tape laid at an oblique angle to the circumferential direction of the mould and tape laid at a perpendicular angle to the circumferential direction of the mould but does not include tape laid in the circumferential direction;
forming the composite material of the laid-up secondary zone to form the flange of the containment case; and
curing the composite material.

* * * * *